(12) United States Patent
Obeid et al.

(10) Patent No.: US 8,141,107 B2
(45) Date of Patent: Mar. 20, 2012

(54) SYSTEM AND METHOD FOR AUTOMATING THE TRANSFER OF DATA FROM A WEB INTERFACE TO ANOTHER

(75) Inventors: Diya Obeid, New York, NY (US); Paul Tauk, Cedars (LB)

(73) Assignee: JobDiva, Incorporated, New York, NY (US)

( * ) Notice: Subject to any disclaimer, the term of this patent is extended or adjusted under 35 U.S.C. 154(b) by 1126 days.

(21) Appl. No.: 11/856,586

(22) Filed: Sep. 17, 2007

(65) Prior Publication Data

US 2008/0072243 A1    Mar. 20, 2008

Related U.S. Application Data

(60) Provisional application No. 60/844,646, filed on Sep. 15, 2006.

(51) Int. Cl.
G06F 9/46 (2006.01)
G06F 17/00 (2006.01)

(52) U.S. Cl. ........................................ 719/329; 715/224

(58) Field of Classification Search .................... 719/329
See application file for complete search history.

(56) References Cited

U.S. PATENT DOCUMENTS

| | | |
|---|---|---|
| 6,944,651 B2 | 9/2005 | Onyon et al. |
| 2003/0101238 A1 | 5/2003 | Davison |
| 2005/0278351 A1* | 12/2005 | Niyogi et al. ................ 707/100 |
| 2006/0041618 A1 | 2/2006 | Chang |
| 2007/0168578 A1* | 7/2007 | Balchandran et al. ......... 710/18 |
| 2007/0239709 A1* | 10/2007 | Wiryawan et al. ............... 707/6 |
| 2008/0313529 A1* | 12/2008 | Gwozdz et al. ............... 715/224 |

OTHER PUBLICATIONS

Daniel Schwabe and Gustavo Rossi "Developing Hypermedia Applications using OOHDM", 1998.*

* cited by examiner

Primary Examiner — Lechi Truong
Assistant Examiner — Abdou Seye
(74) Attorney, Agent, or Firm — Greenberg Traurig LLP

(57) ABSTRACT

A script-based scenario designer application for automating the data transfer from one web interface to another. The script-based scenario designer receives sender and receiver web interface addresses from a user, displays the sender web interface to the user; monitors user interactions with the sender web interface, such as the entering of credentials; and receives from the user a data field mapping comprising a correlation of at least one sender web interface data field to at least one receiver web interface data field. The script-based scenario designer stores the sender web interface data field mapping and the user interactions as a scenario and allows the user to validate the scenario by retrieving a data field from the sender web interface, formatting the retrieved data field in accordance with instructions optionally stored in the scenario, and transmitting the formatted data field to the receiver web interface in accordance with the scenario.

17 Claims, 18 Drawing Sheets

SYSTEM AND METHOD FOR AUTOMATING THE TRANSFER OF DATA FROM A WEB INTERFACE TO ANOTHER

This application claims priority from Provisional U.S. Patent Application Ser. No. 60/844,646, filed on Sep. 15, 2006, which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of data transfer, and in particular to a system and method for automating the transfer of data from a web interface to another, wherein a user with minimal technical knowledge can implement the system and method.

BACKGROUND

Widespread adoption of the Internet by the public and the business world has lead to increasing amounts of data and information being available on-line. Several Internet-based methods for transmitting information exist, but the method is typically chosen by the sender without input from the receiver. While the Internet was in its infancy, e-mail was the most popular means for transmitting information, whereas today, web pages are increasingly more popular means for transmitting information.

Web page delivery has become popular with senders due to its cross-platform compatibility, convenience, flexibility, and ease of management. Receivers can navigate web pages using hyperlinks, buttons, arrows, or the like, which can lead to other web pages containing information or data. The framework in which the receiver navigates is ultimately decided by the sender. The sender can control the level of data available to the receiver, or re-direct the receiver to web pages containing extraneous images, advertisements, incomplete data, or the like.

SUMMARY

Accordingly, the instant disclosure is directed to a system and method for automating the transmission of data from one web interface to another that substantially obviates one or more of the problems due to limitations and disadvantages of the related art. In some embodiments, the instant system comprises two applications, a scenario designer application and a scenario executor. Using the scenario designer, a user can define one or more sender sites from which data is to be collected, including usernames, passwords, or other authentication information necessary to gain access to the sender site. The user also uses the scenario designer to map sender site data to a receiver web site, thereby facilitating the automated transfer of information from the sender to the receiver web site. The scenario designer saves the scenario for later execution by the scenario executor. In some embodiments, scenarios are saved in the Extensible Markup Language ("XML").

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

In some embodiments the disclosed system and method allow a user to easily streamline the collection of data from one or more sender websites and the transmission of such data to one or more receiver websites, without requiring any programming knowledge on the part of the user. Using the disclosed system and methods, the user can also easily re-map data fields in response to changes in the sender or receiver websites without necessitating hiring someone with programming knowledge, and the costs and expenses associated therewith.

Some embodiments may comprise computer program process code, tangibly stored on at least one computer readable medium, the computer program process code comprising instructions implementing a scenario designer, comprising instructions for causing the scenario designer to enter an initialization mode, the initialization mode comprising receiving from a user a sender web interface from which information is to be obtained; displaying to the user the sender web interface within a web interface display area; and, monitoring user interaction with the sender web interface to obtain any necessary credentials and storing the credentials; causing the scenario designer to enter run mode, the run mode comprising displaying a sender web interface to a user, displaying a receiver web interface to the user, and allowing the user to map data fields from the sender web interface to data inputs on the receiver web interface by selecting data fields on the sender web interface and data inputs on the receiver web interface; storing the data field mappings; and causing the scenario designer to connect to the sender web interface, retrieve at least one mapped data field from the sender web interface, and transmit retrieved data to the receiver web interface such that the transmitted information can be reviewed by the user; and associating the stored data field mappings and the stored credentials with a scenario. The computer program process code may further comprise instructions for periodically causing a server to execute the scenario. In some embodiments, a plurality of sender web interfaces can be received from a user as part of the initialization mode, and the run mode can be entered for each of the plurality of sender web sites. In some embodiments, the scenario may comprise a series of instructions, interpretable by a server, for automating the retrieval of data. In some embodiments, the run mode may further comprise receiving a user formatting selection from the user via the scenario designer application, the user formatting selection comprising at least one function to be applied to a mapped sender web interface data field. The user formatting selection is stored as part of the scenario.

Some embodiments may comprise a data transfer method, comprising displaying a scenario designer application to a user; receiving a sender web interface address from the user via the scenario designer application; receiving a receiver web interface address from the user via the scenario designer application; displaying, based on the received sender web interface address, the sender web interface to the user via the scenario designer application; receiving a sender web interface data field mapping from the user via the scenario designer application, the sender web interface data field mapping comprising a mapping of at least one sender web interface data field to at least one data field in the receiver web interface; defining and storing a scenario, the scenario comprising the sender web interface data field mapping; connecting to the sender web interface over a first communication network; retrieving a data field from the sender web interface; formatting the data field, according to the scenario, to create a formatted data field; connecting to the receiver web interface, via the server, over a second communication network; and, transmitting the formatted data field, from the server, to the receiver web interface, according to the scenario. Some embodiments may further comprise receiving login credentials from the user and storing the login credentials as part of the scenario. In some embodiments, a user formatting selection may be received from the user via the scenario designer application, the user formatting selection comprising at least one function to be applied to a mapped sender web interface data field. The user formatting selection can be stored as part of the scenario, and the scenario can be stored on a server. In some embodiments, the first and second communications networks comprise the same communication network, such as the Internet. The data field can be retrieved from the sender web site via a server, and the sender web interface data field mapping may further comprise a mapping between a sender web interface data field and at least one local data field. The sender web interface data field mapping may further comprise a mapping between the at least one local data field and at least one data field in the receiver web interface.

It is to be understood that both the foregoing general description and the following detailed description are exemplary and explanatory and are intended to provide further explanation of the disclosed system and method for automating the transmission of data from a web interface to another.

BRIEF DESCRIPTION OF THE DRAWINGS

The accompanying drawings, which are included to provide a further understanding of the disclosed system and method for automating the transmission of data from a web interface to another and are incorporated in and constitute a part of this specification, illustrate various embodiments and, together with the description, serve to explain the principles of at least one embodiment of the disclosed system and method for automating the transmission of data from a web interface to another.

In the drawings:

FIG. 6 is an exemplary screen capture illustrating a scenario designer application according to an embodiment.

FIG. 8 is an exemplary screen capture illustrating a scenario designer application according to an embodiment.

FIG. 18 is an exemplary screen capture illustrating a scenario being executed according to an embodiment.

DETAILED DESCRIPTION

Reference will now be made in detail to embodiments of the disclosed system and method for automating the transfer of data from a web interface to another, examples of which are illustrated in the accompanying drawings.

Figure 1:
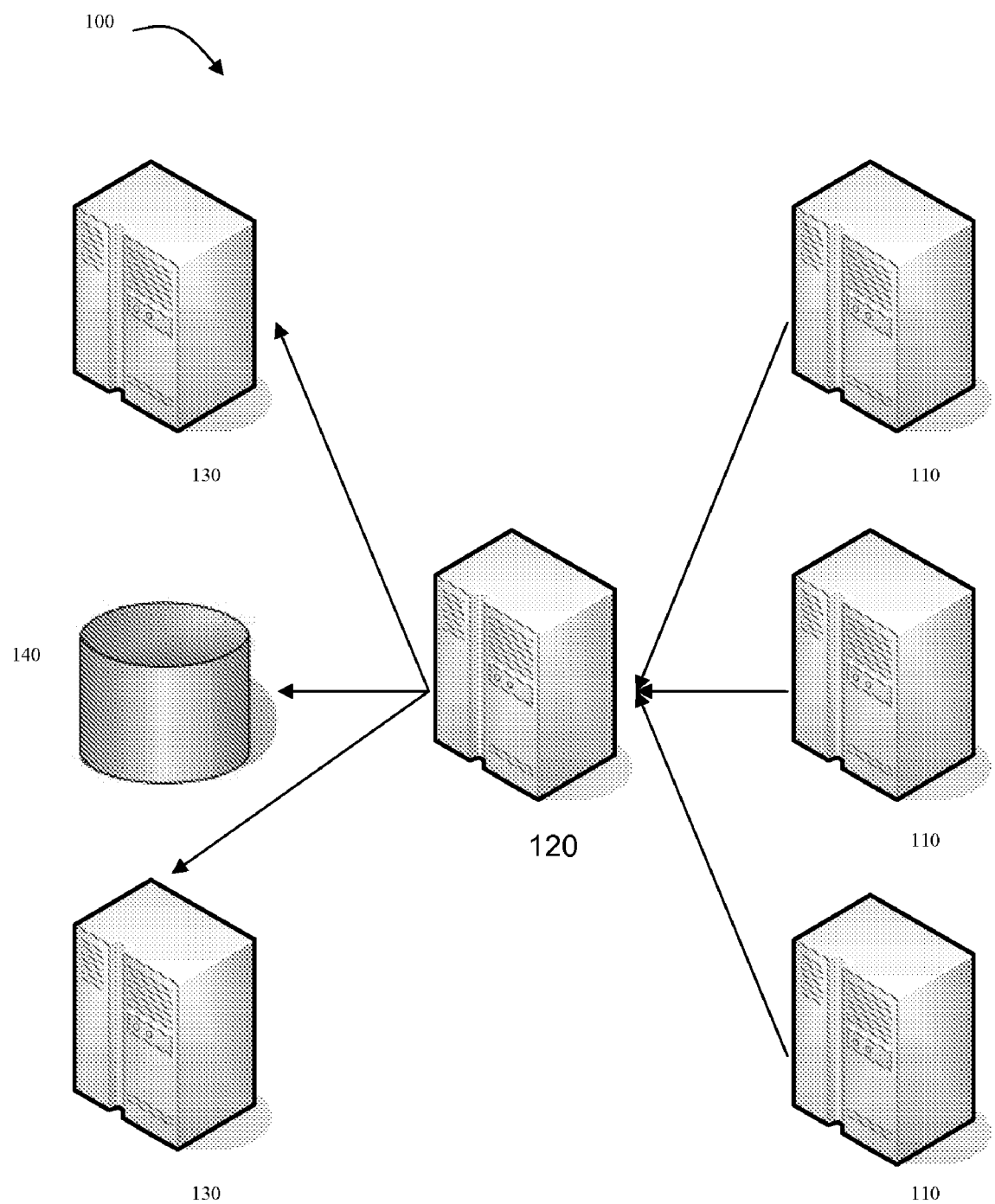
FIG. 1 is a block diagram illustrating a system architecture according to an embodiment.

FIG. 1 illustrates a system architecture 100 for automating the transfer of data from a web interface to another, in accordance with some embodiments. Data is housed on at least one sender web interface 110. Sender web interface 110 is communicatively coupled with server 120 via a private or non-private network, such as, but not limited to the Internet. Server 120 can also be communicatively coupled with a receiver web interface 130 or a database 140. A data transfer application, or scenario executor, running on server 120, automates the transfer of data between sender web interface 110 and receiver web interface 130 and/or database 140 by performing one or more user-defined scripts. The data transfer application can comprise one or more forms, executable on a networked computing device, such as, but not limited to, compiled, stand-alone machine code, such as that written in Visual C++, Visual Basic, Delphi, or the like; run-time scripts, such as those written in JavaScript, Visual Basic Script, or the like; macros, command level files, or the like.

By way of example, without limitation, a user may want to store hourly weather readings for his locale in database 140. Sender web interface 110 may comprise a weather website requiring the user to provide login credentials prior to providing weather readings. The data transfer application can automatically provide the login credentials to sender web interface 110 on an hourly basis, retrieve the weather readings, and store them in database 140, without requiring any interaction by the user.

By way of another example, without limitation, a tax advisor may wish to automatically send state lottery winners promotional materials regarding services offered by the tax advisor. In this example, sender web interfaces 110 would comprise a state lottery website displaying the lottery winners' names and hometown as well as a phone directory website, for locating the lottery winners' home address. Receiver web interface 130 would comprise a printing website that the tax advisor uses to print promotional materials. The data transfer application can periodically query the state lottery website to retrieve the name(s) of new lottery winners. After receiving the name of a new lottery winner, the data transfer application would query the phone directory website to retrieve the lottery winner's home address. The data transfer application would then provide any necessary credentials, input the lottery winner's name and address into the printing website, and place an order to have promotional materials sent to the lottery winner. In both of the preceding examples, system architecture 100 and the scripts run by the data transfer application allow the user to transfer data between web interfaces and databases, while alleviating the burdens typically associated with doing so.

In some embodiments, four elements are used in facilitating the transfer of data from a web interface to another. Although emphasis is placed on a four element architecture, it should be apparent to one skilled in that art that the functions and features associated with the four disclosed elements can be combined, further delineated, or provided by an alternative architecture without departing from the spirit and scope of the disclosure. By way of example, without limitation, in some embodiments, server 120 can comprise database 140.

As described above, the scenario executor, or data transfer application, executes scenarios designed by a user to facilitate the data transfer. Some embodiments, such as those illustrated in FIGS. 2 through 12, employ a scenario designer application which allows the user to quickly and efficiently create a data transfer script (referred to herein as a data transfer scenario), interpretable by the data transfer application, with little or no prior programming knowledge. The scenario designer application can display a scenario hierarchy 240 that represents the different steps to be taken by the data transfer application while executing the defined data transfer scenario. Scenario hierarchy 240 can comprise initialization mode node 250, run mode node 260, and end scenario node 270. Although a hierarchy with three main nodes is illustrated and described herein, the hierarchy is intended to be exemplary. Alternative hierarchies, including, without limitation, a hierarchy comprising a single main node, may be substituted for the disclosed three-node hierarchy without departing from the spirit or the scope of the disclosed system and method.

Initialization mode defines the interactions necessary to gain access to the sender web interface from which information is to be retrieved. In some embodiments, the user can designate one or more sender web interfaces via home page node 252, which can be implemented as a child node of login and initialization node 251. Login and initialization node 251 may itself be implemented as a child node of initialization mode node 250.

Figure 2:
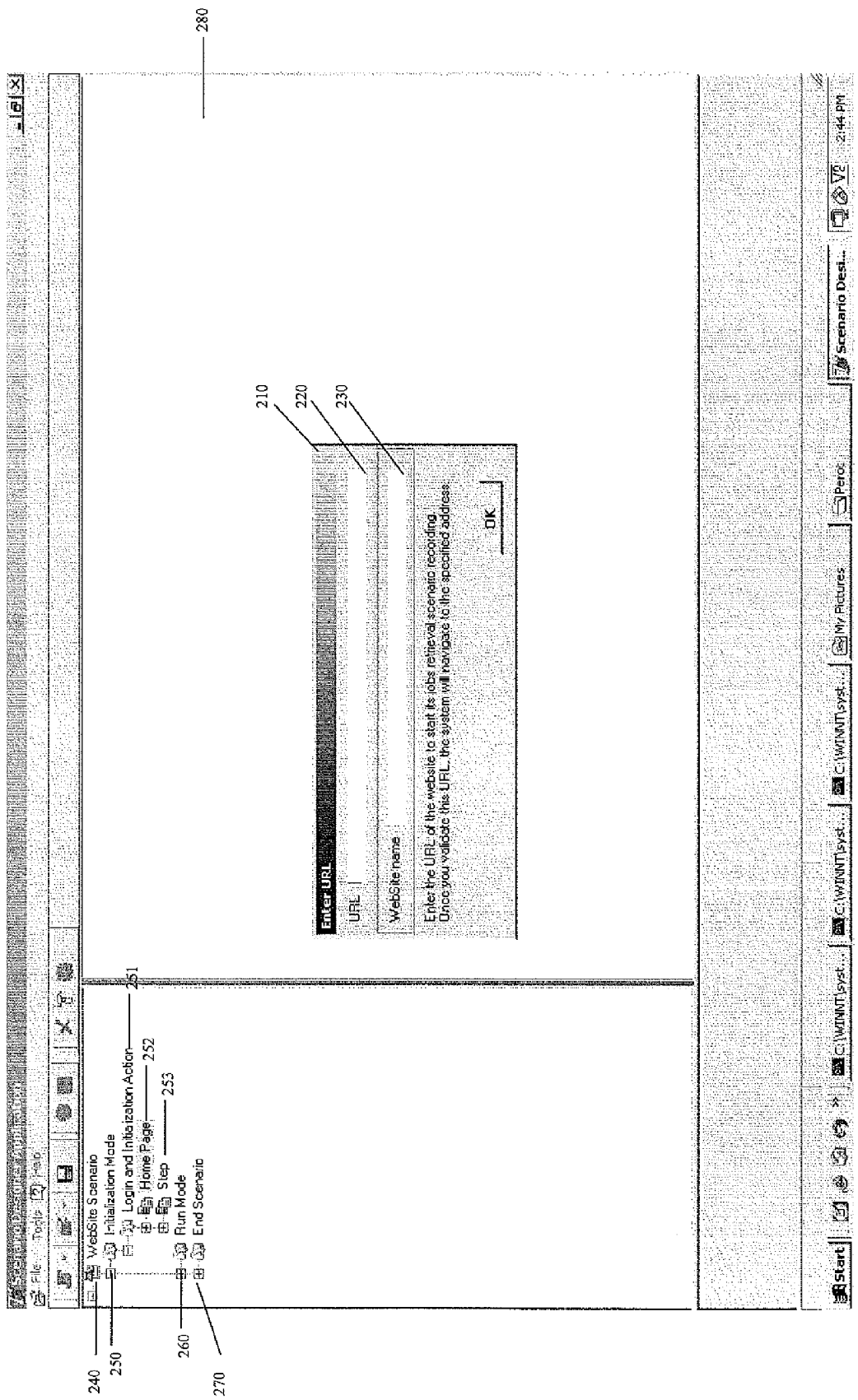
FIG. 2 is an exemplary screen capture illustrating a scenario designer application according to an embodiment.
Figure 3:
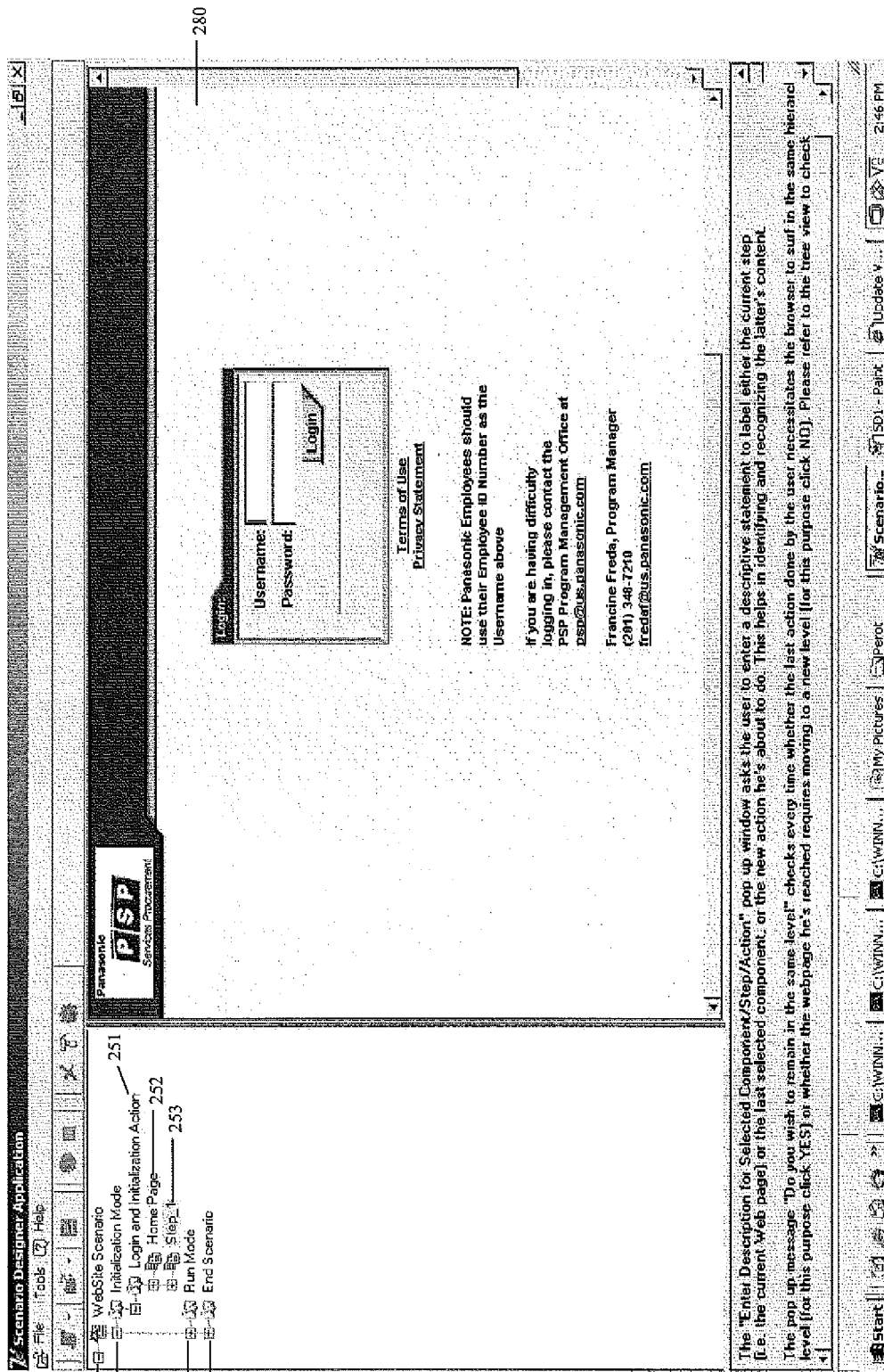
FIG. 3 is an exemplary screen capture illustrating a scenario designer application according to an embodiment.
Figure 4:
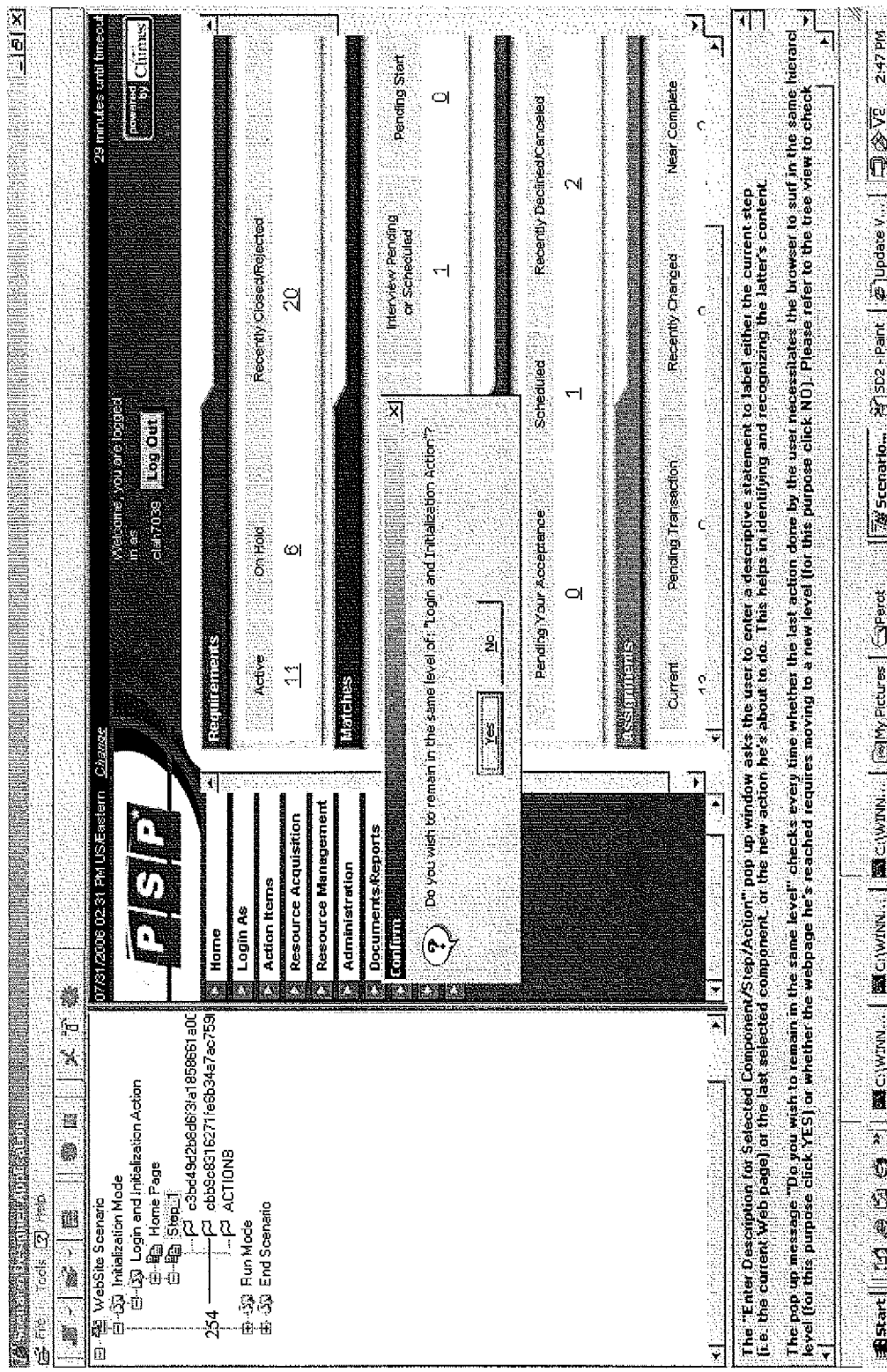
FIG. 4 is an exemplary screen capture illustrating a scenario designer application according to an embodiment.

To help guide the user in defining a scenario, the instant system may display a series of dialog boxes, web-based forms, or the like, such as add sender web interface dialog 210 of FIG. 2. Add sender web interface dialog 210 contains a Universal Resource Locator ("URL") field 220 and a website name field 230. The user can enter a URL for a sender web interface into URL field 220 and a descriptive name into website name field 230. Clicking the OK button adds the entered sender web interface to the scenario, retrieves the sender web interface that was entered in URL field 220, and displays it in web interface display area 280, as illustrated in FIG. 3.

In some embodiments, the scenario designer application allows the user to interact with the displayed sender web interface dialog 210 via web interface display area 280 and records user interaction therewith. By way of example, without limitation, the user may need to provide login credentials prior to sender web interface dialog 210 allowing access thereto, and the scenario designer can cause such credentials to be stored for later use. After providing the login credentials, sender web interface dialog 210 may require that the user may click on or otherwise interact with one or more hyperlinks, buttons, or the like before accessing the relevant data within the web interface. Each interaction within initialization mode node 250 can create another sub-step node 254 within home page node 250. In some embodiments, the scenario designer application records each such interaction, thereby learning the interactions necessary to obtain the data desired by the user. At regular intervals, such as, without limitation, after fixed periods of time or after a number of interactions have been recorded, the scenario designer application can display a dialog, such as the dialog illustrated in FIG. 4, asking the user whether the scenario designer application should remain within initialization mode node 250 or move to run mode node 260.

Figure 5:
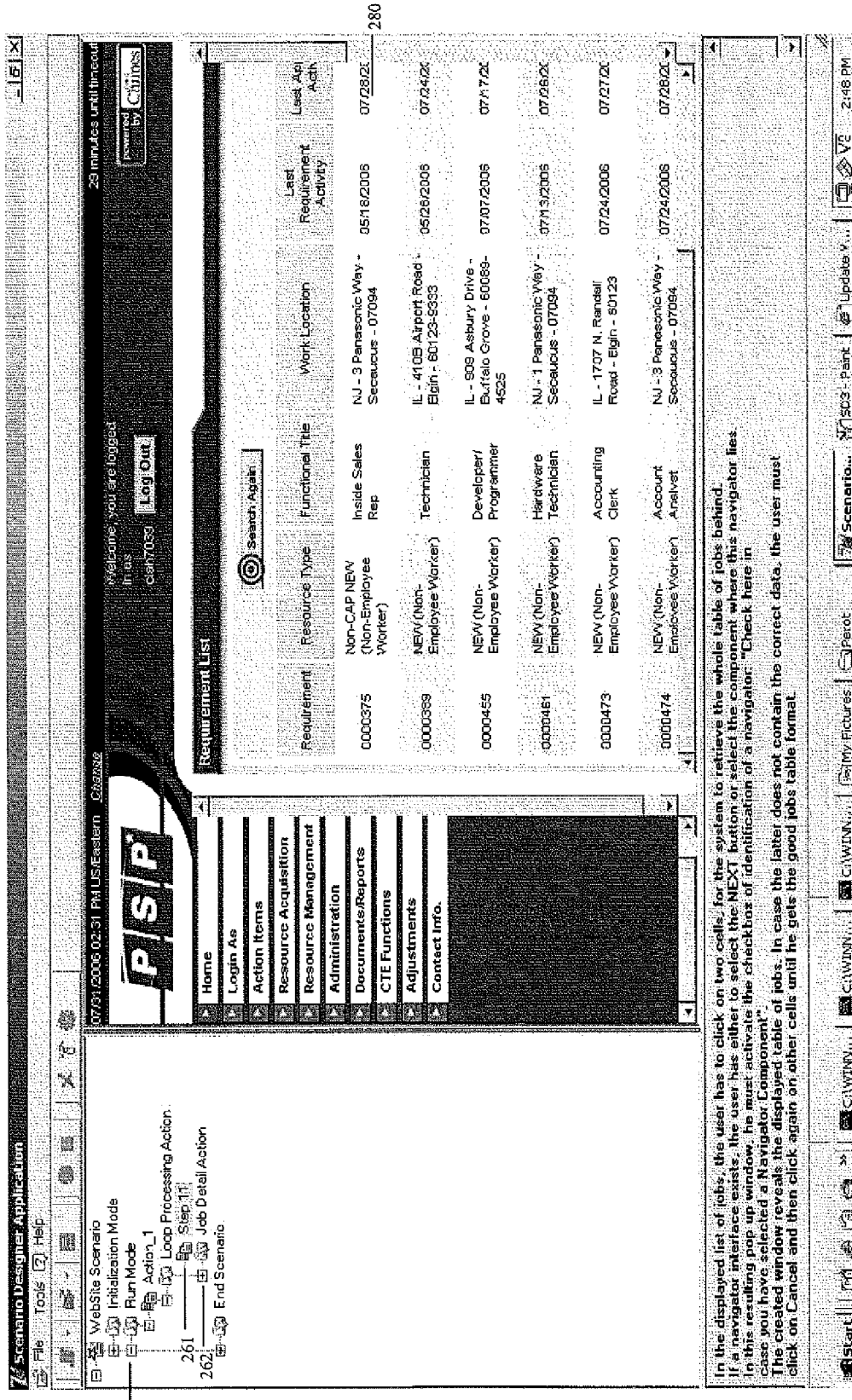
FIG. 5 is an exemplary screen capture illustrating a scenario designer application according to an embodiment.

Once the initialization information has been entered, the scenario designer can enter run mode 260. Run mode 260 allows the user to define the information to be obtained, including configuring the mapping of information from one or more fields in sender web interface dialog 210 to corresponding fields within a user database or a recipient interface. Run mode 260 can also be used to define iterative and/or repetitive steps taken to obtain the actual information of interest to the user. Run mode 260 also allows the user to map data obtained from one or more fields in the sender web interface In some embodiments, as illustrated in FIG. 5, run mode node 260 can comprise loop processing action node 261 and job detail action node 262. Loop processing of data presented on a web interface can be advantageous for data delineated in a regular pattern, such as the chart illustrated in web interface display 280 of FIG. 5.

Figure 6:
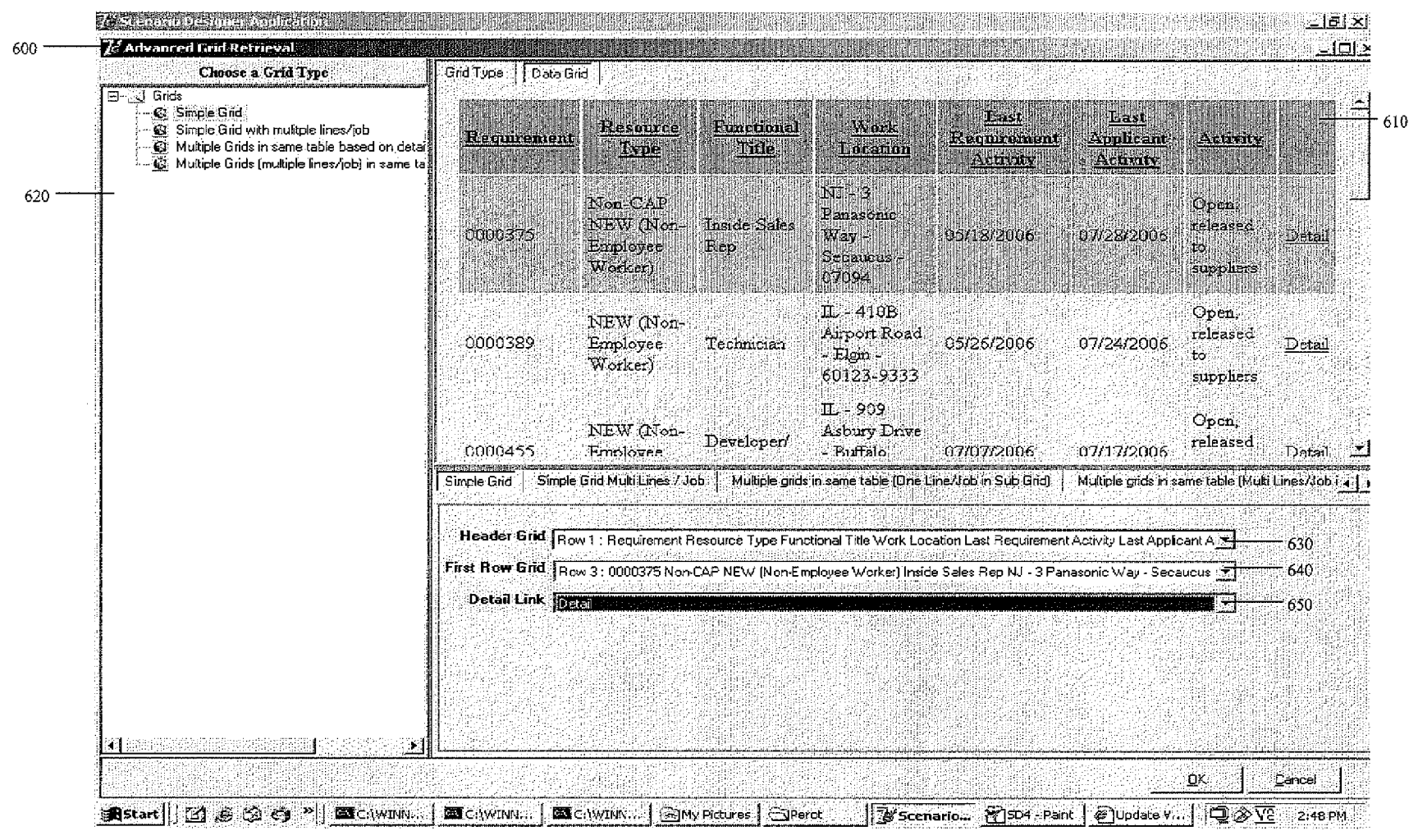

In some embodiments, as illustrated in FIG. 6, the scenario designer application can further provide a grid retrieval dialog 600 for processing web interface data contained in tables, grids, or other similar formats. In some embodiments, grid retrieval dialog 600 can display the web interface data in a web interface display 610. Grid type selector 620 allows the user to select a grid format, such as, but not limited to, simple grid, simple grid with multiple lines/job, multiple grids in the same table based on detail, multiple grids (multiple lines/job) in same table based on detail, or the like.

In some embodiments, when simple grid is selected in grid type selector 620, grid retrieval dialog 600 can further comprise a header grid selection 630, a first row grid selection 640, and a detail link selection 650. Header grid selection 630 allows the user to select which row of the grid contains header information. Grid retrieval dialog 600 can use the header information to label data extracted from the columns of the grid. First row grid selection 640 allows the user to select the first row of the grid that contains data. Detail link selection 650 allows the user to select which column of the grid contains a link leading to more details for a given row.

Figure 7:
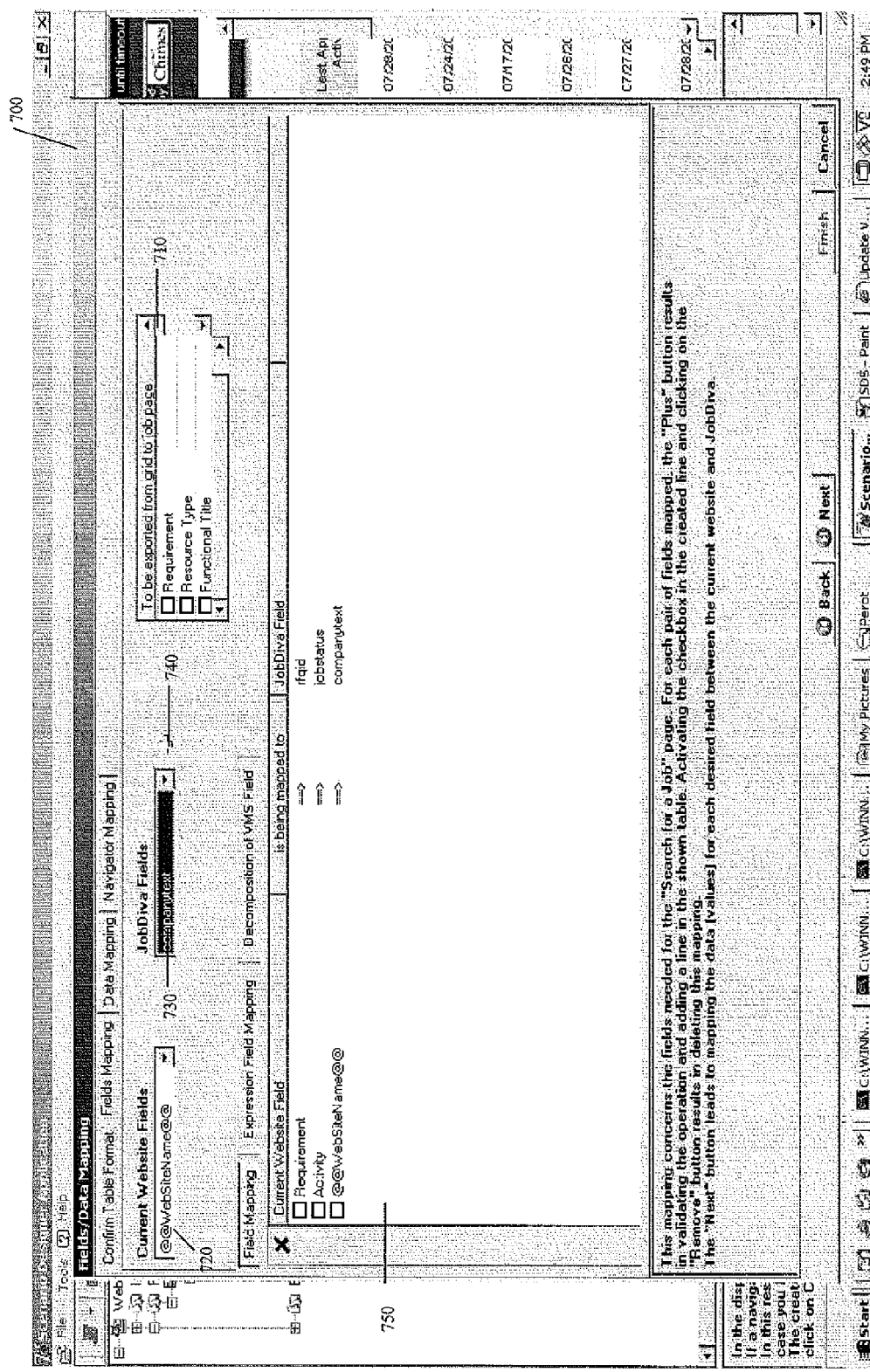
FIG. 7 is an exemplary screen capture illustrating a scenario designer application according to an embodiment.

In some embodiments, as illustrated in FIG. 7, the scenario designer application can provide a field mapping dialog 700 to allow the user to map data fields from the sender web interface to user defined variables. Field mapping dialog 700 can comprise an export selection 710, an export field selection 720, a local field selection 730, a mapping button 740, and a mapping display 750. Selecting one or more fields in export selection 710 adds the fields to export selection 720. Clicking mapping button 740 causes a mapping to be created between the field displayed in export field selection 720 and the field displayed in local field selection 730. Mappings are displayed to the user in mapping display 750.

Figure 8:
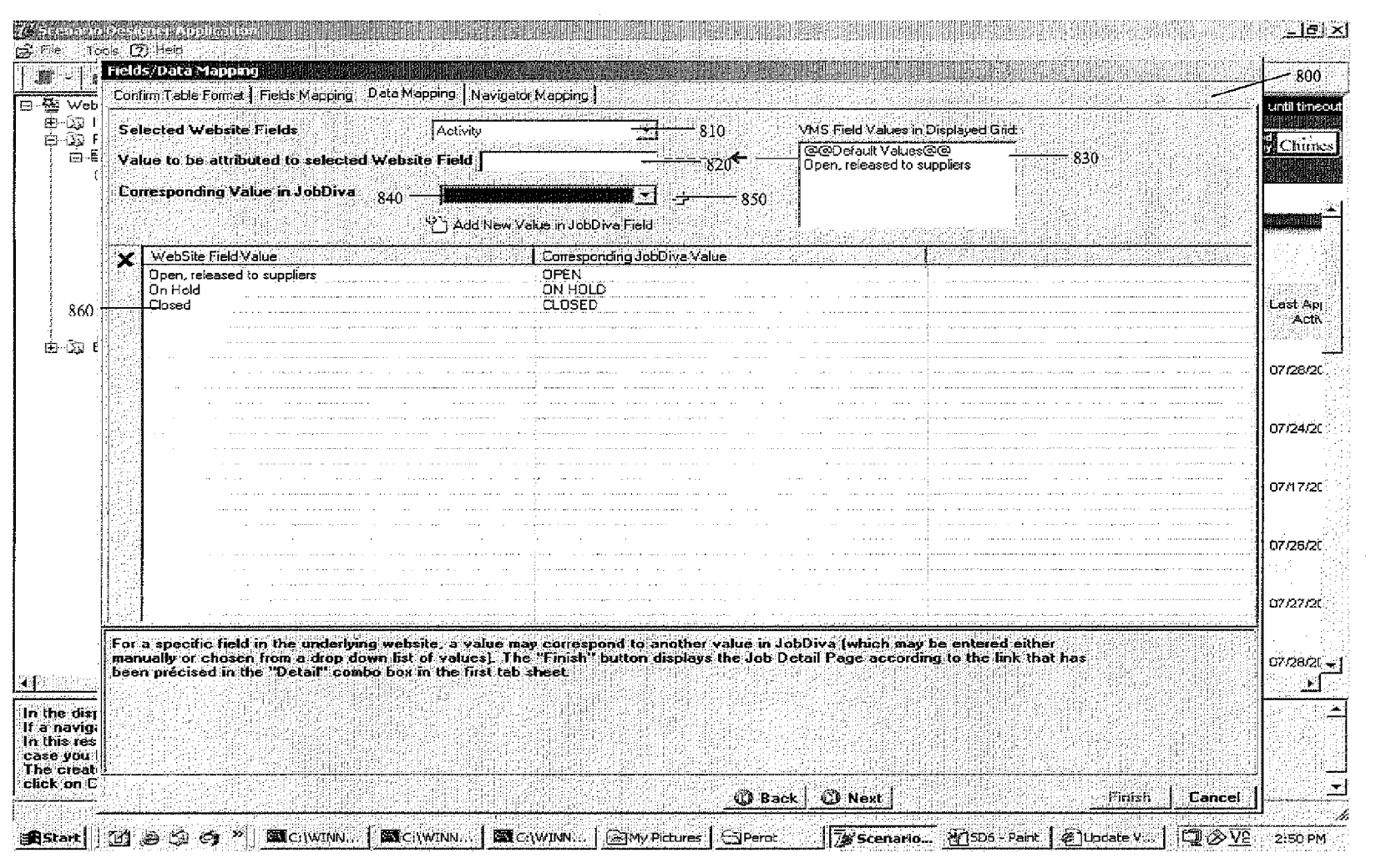

In some embodiments, as illustrated in FIG. 8, the scenario designer application can provide a data mapping dialog 800 to allow the user to map data values from the sender web interface to the remote web interface or user defined variables. By way of example, without limitation, the sender web interface might contain a data column containing values of either "T" or "F". The user may desire to have these values mapped to "True" or "False". Alternatively, the data on the sender web interface may be displayed in an inverse matter to the form in which the user wants to display the data, so the user could correct the data form by mapping "T" to "False" and "F" to "True".

In some embodiments, data mapping dialog 800 can comprise a field selection 810, a value input 820, a remote value selection 830, a local value selection 840, a mapping button 850, and a data mapping display 860. Field selection 810 is populated with data fields from the sender web interface. Selecting an individual data field in field selection 810 populates remote value selection 830 with each value that is currently in the selected data field of the sender web interface. The user can select a local data value from local value selection 840 and map it to either one or more data values in remote value selection 840, or a value manually entered into value input 820, by clicking mapping button 850. Data value mappings are displayed to the user in data mapping display 860.

Figure 9:
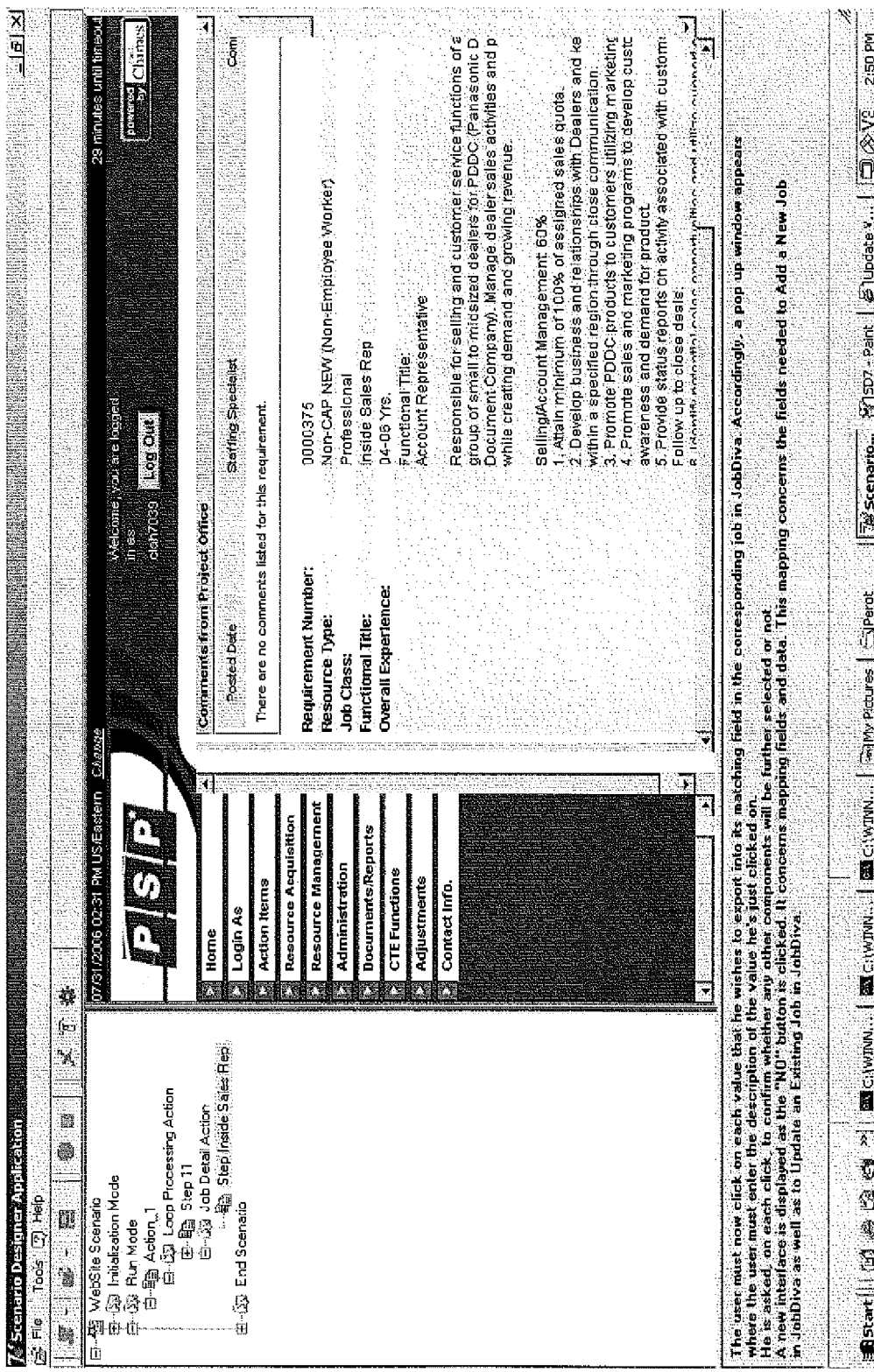
FIG. 9 is an exemplary screen capture illustrating a scenario designer application according to an embodiment.
Figure 10:
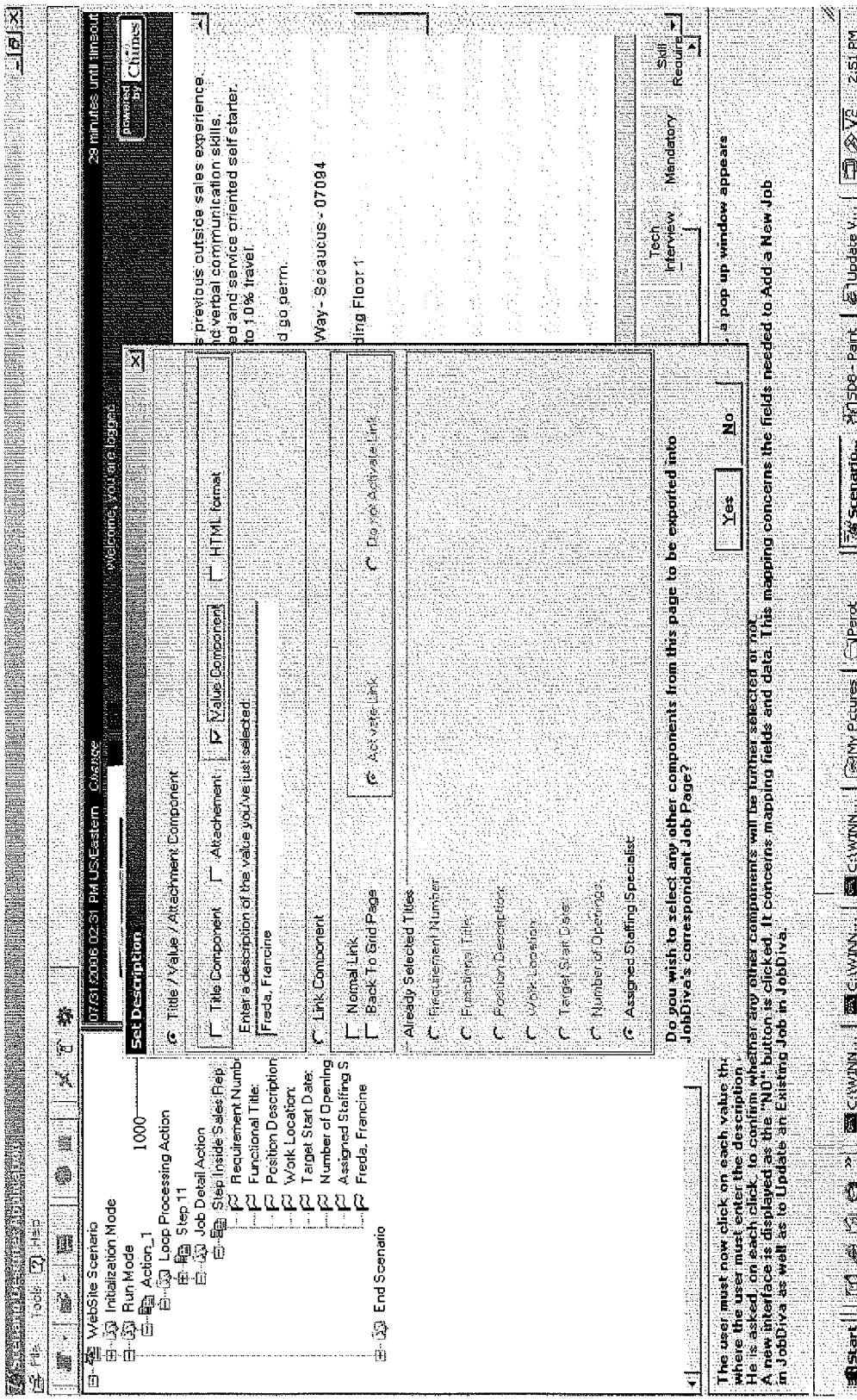
FIG. 10 is an exemplary screen capture illustrating a scenario designer application according to an embodiment.

In some embodiments, as illustrated in FIG. 9, the scenario designer application can display the information contained in the detail link defined in detail link selection 650 of grid retrieval dialog 600. In some embodiments, as illustrated in FIG. 10, the scenario designer application can provide a description limiting dialog 1000. Description limiting dialog 1000 allows the user to limit the data extraction performed on the detail link data to only those detail links containing criteria defined by the user. By way of example, without limitation, the user in FIG. 10 is limiting data extraction to those detail links in which "Freda, Francine" is the Assigned Staffing Specialist.

Figure 11:
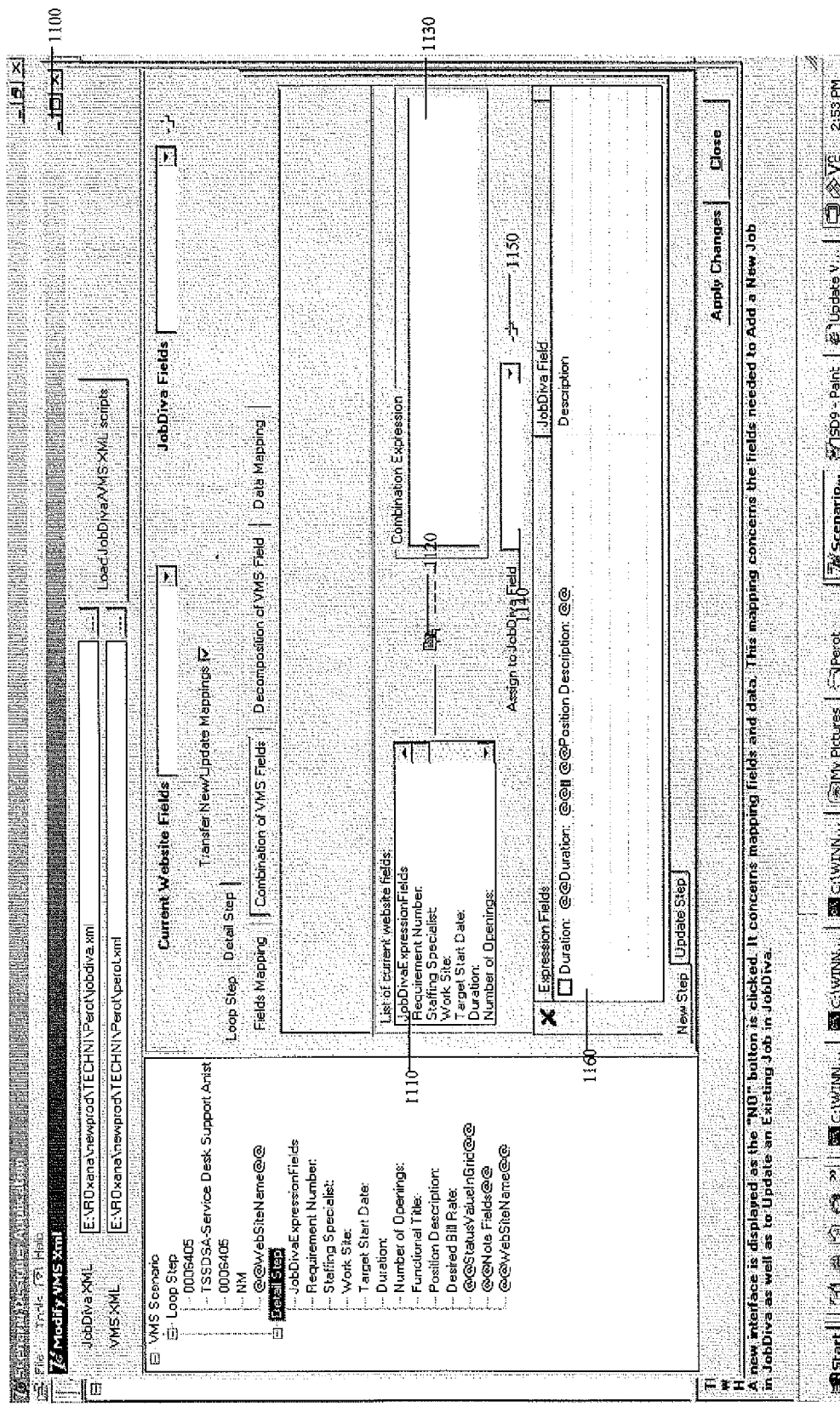
FIG. 11 is an exemplary screen capture illustrating a scenario designer application according to an embodiment.

In some embodiments, as illustrated in FIG. 11, the scenario designer application can provide a value combination dialog 1100 to allow the user to combine multiple sender web interface data fields into a single local data field. Value combination dialog 1100 can comprise a remote field selection list 1110, a remote field selection button 1120, a selected remote field display 1130, a local field selection 1140, a mapping button 1150, and a combination display 1160. Remote field selection list 1110 is populated with all of the data fields from the sender web interface. The user can select one or more sender web interface data fields to combine in remote field selection list 1110 and add the fields to selected remote field display 1130 by clicking remote field selection button 1120. Local field selection 1140 is populated with local data fields. The user can map the combine the data fields displayed in selected remote field display 1130 to the data field selected in local field selection 1140 by clicking mapping button 1150, which causes the combination to be displayed in combination display 1160.

Figure 12:
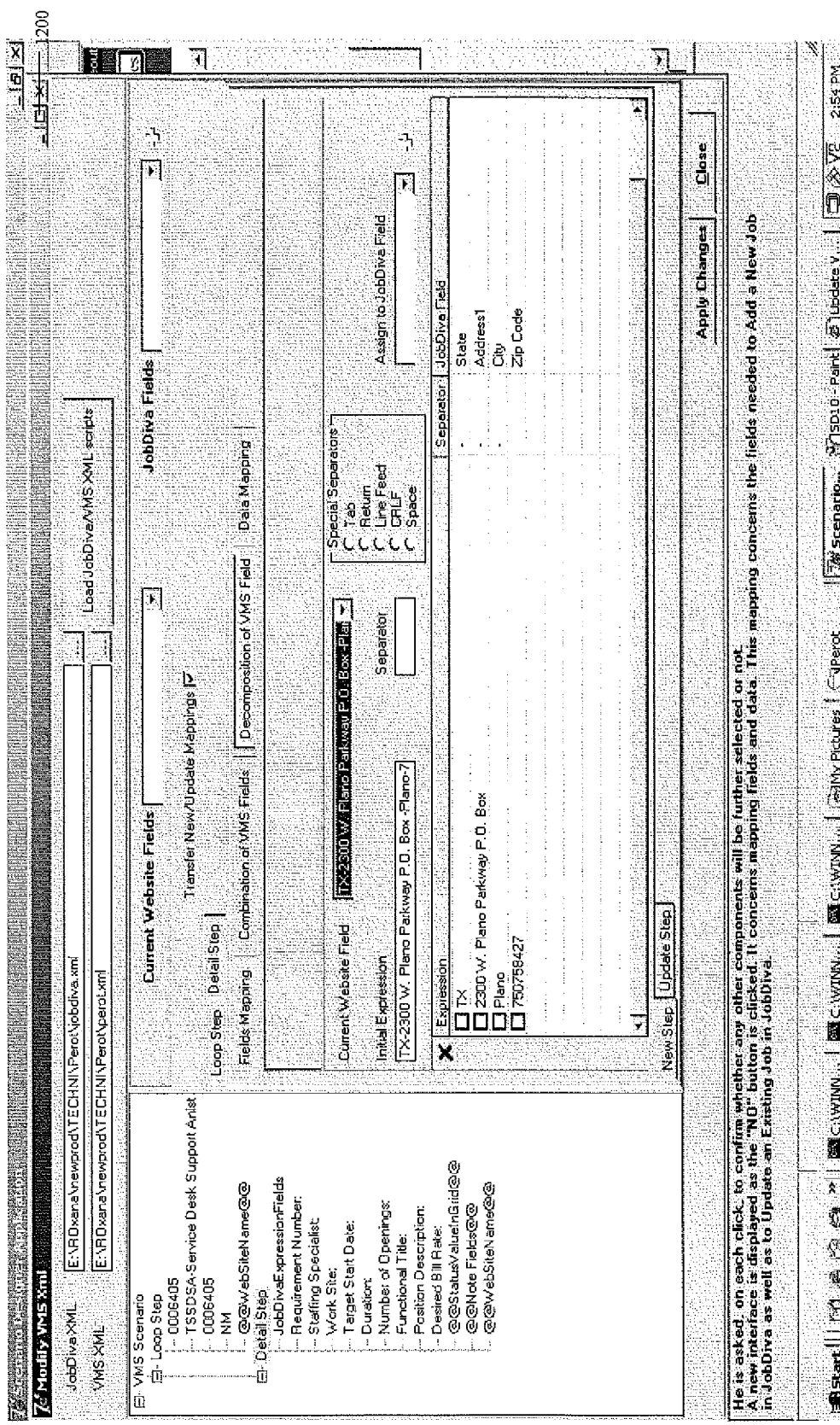
FIG. 12 is an exemplary screen capture illustrating a scenario designer application according to an embodiment.

In some embodiments, as illustrated in FIG. 12, the scenario designer application can provide a value decomposition dialog 1200. Value decomposition dialog 1200 is similar in operation to value combination dialog 1100, the difference being that value decomposition dialog 1200 allows the user to take a single data field from a sender web interface and parse it into multiple local data fields. For example, as illustrated in FIG. 12, the user can take a single data field in the sender data interface that contains an address and split the data field into multiple local data fields representing state, address, city and zip code.

Figure 13:
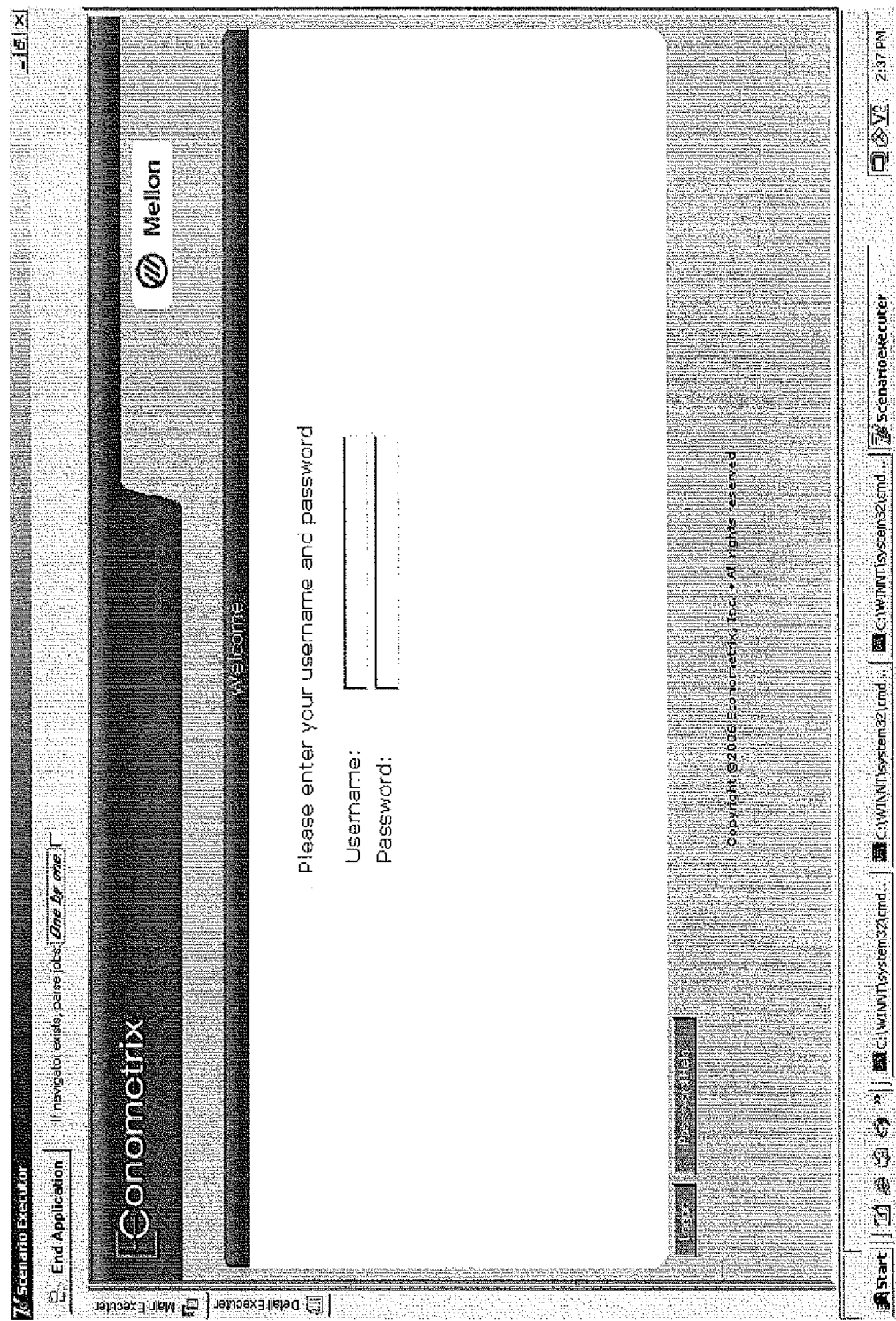
FIG. 13 is an exemplary screen capture illustrating a scenario being executed according to an embodiment.
Figure 14:
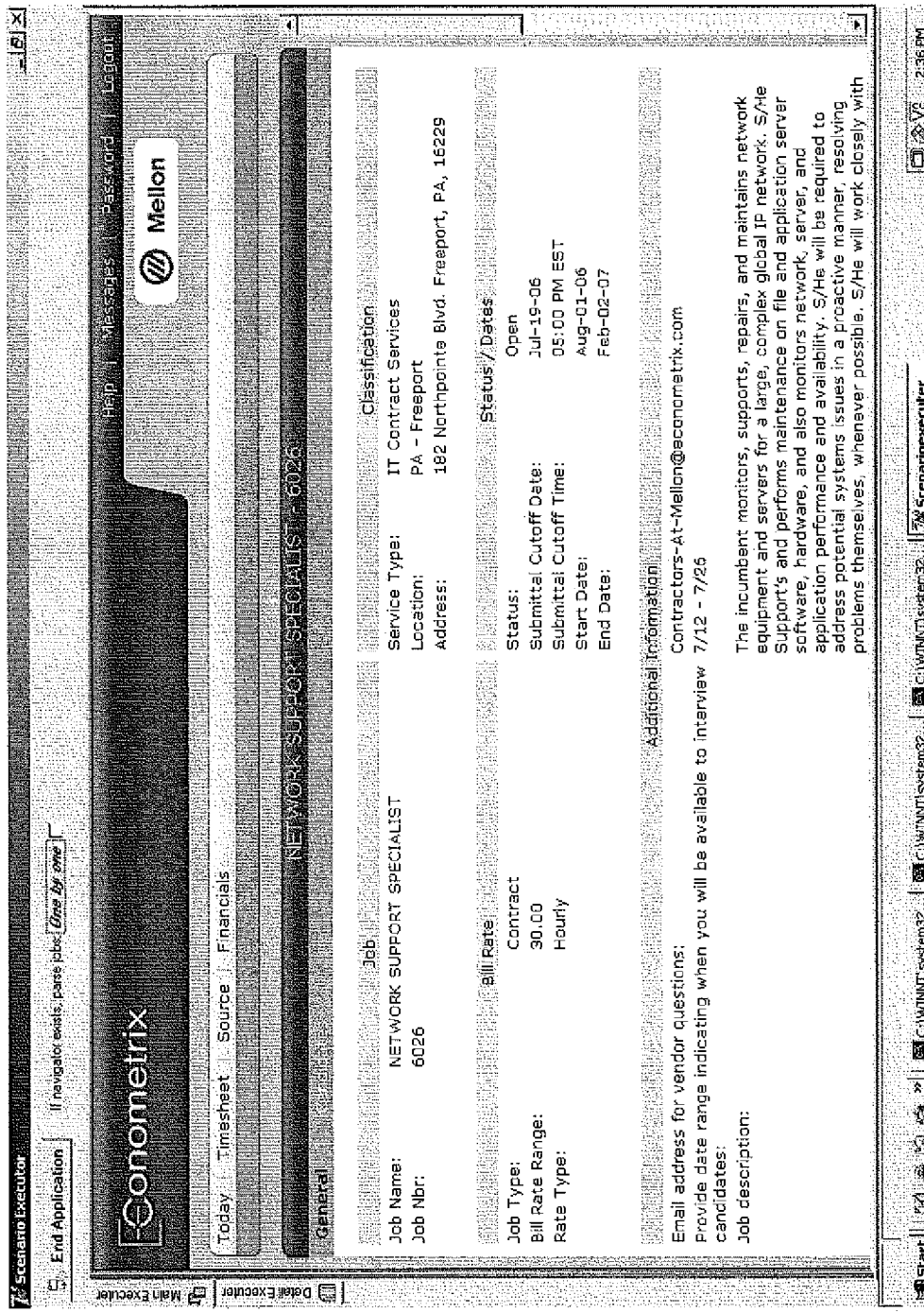
FIG. 14 is an exemplary screen capture illustrating a scenario being executed according to an embodiment.
Figure 15:
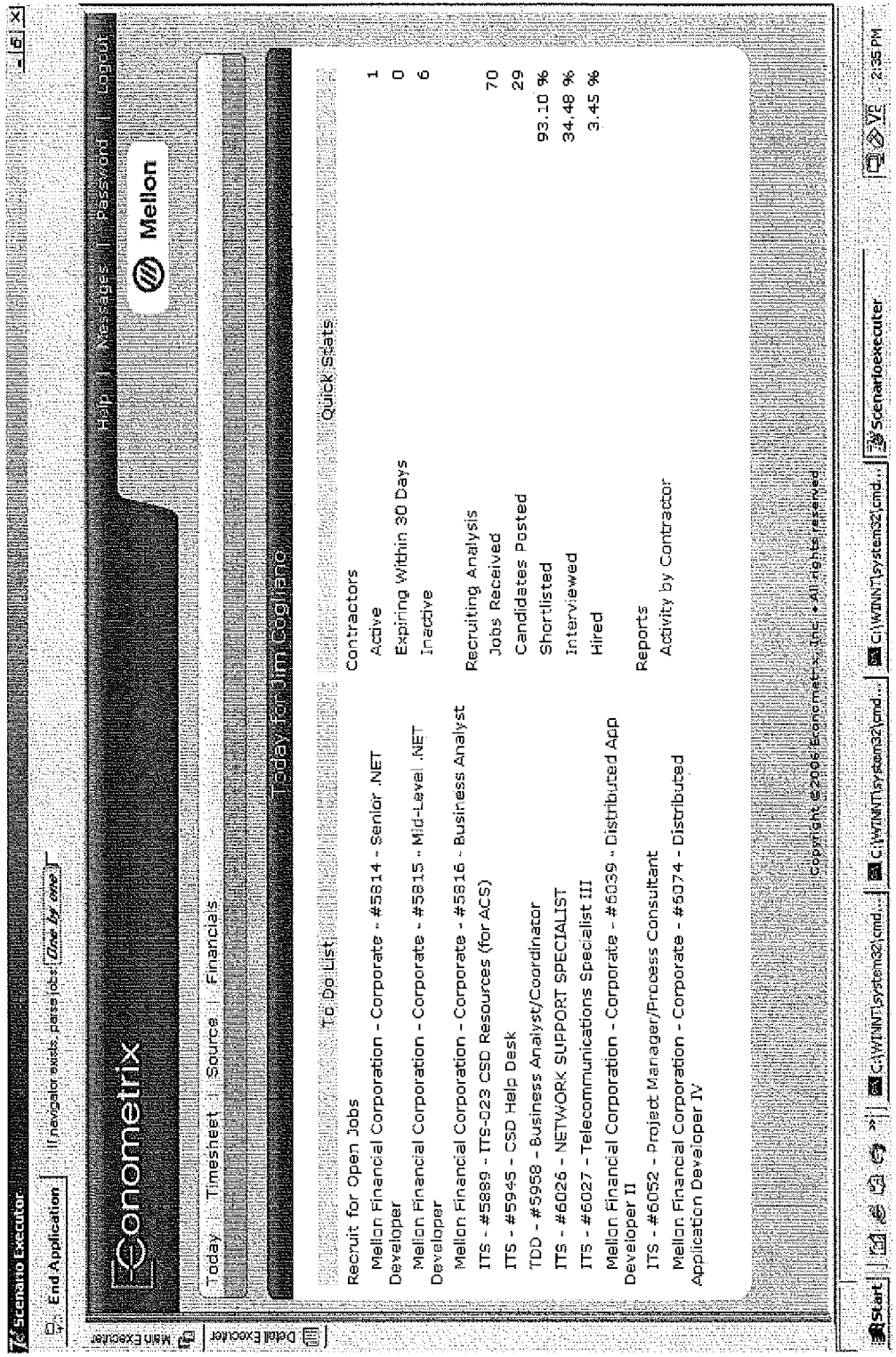
FIG. 15 is an exemplary screen capture illustrating a scenario being executed according to an embodiment.

As described above, the scenario designer stores the user-created scenario for later execution by a data transfer application. FIGS. 13-18 illustrate the execution of a previously designed scenario by a data transfer application. In FIG. 13, the data transfer application is presented with a request for login credentials. The data transfer application provides the login credentials, which then allows the data transfer application to access the sender web interfaces illustrated in FIGS. 14-15.

Figure 16:
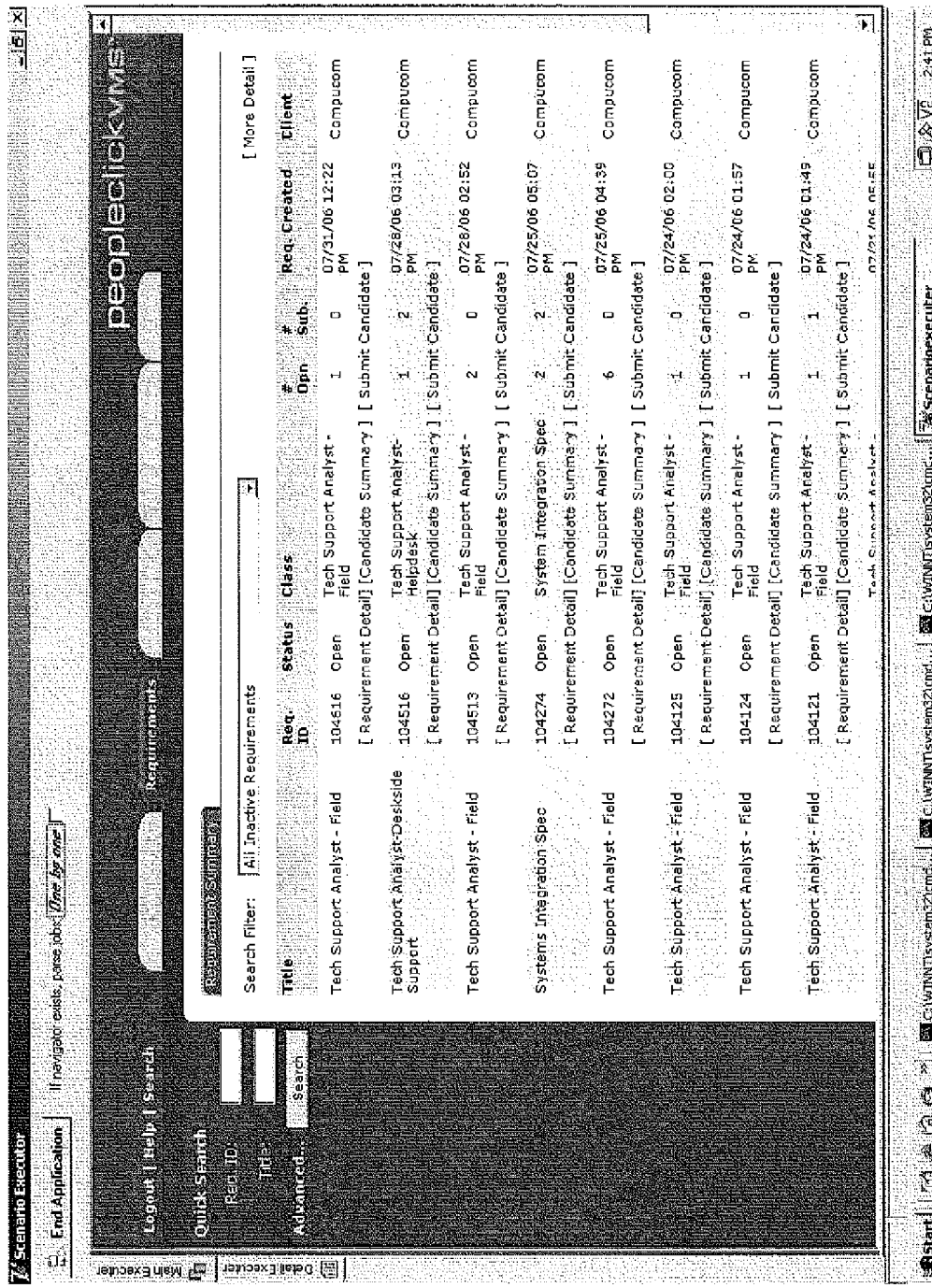
FIG. 16 is an exemplary screen capture illustrating a scenario being executed according to an embodiment.
Figure 17:
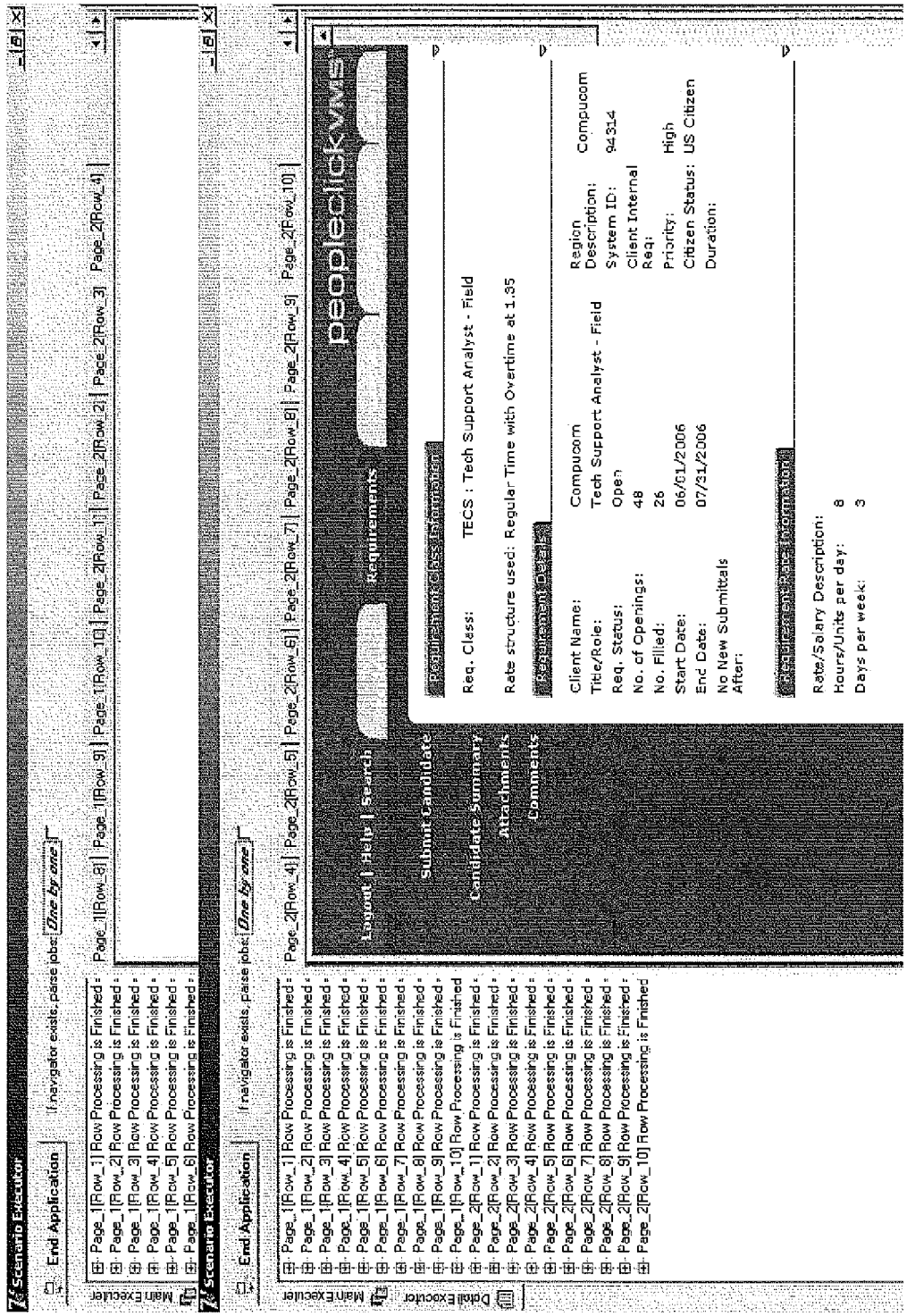
FIG. 17 is an exemplary screen capture illustrating a scenario being executed according to an embodiment.

In some embodiments, the data transfer application can perform loop processing of data stored on a sender web interface in a table, grid, or other similar format as illustrated in FIG. 16. In some embodiments, while performing loop processing, the data transfer application can display the details for each row as it is processed, as illustrated in FIG. 17.

Figure 18:
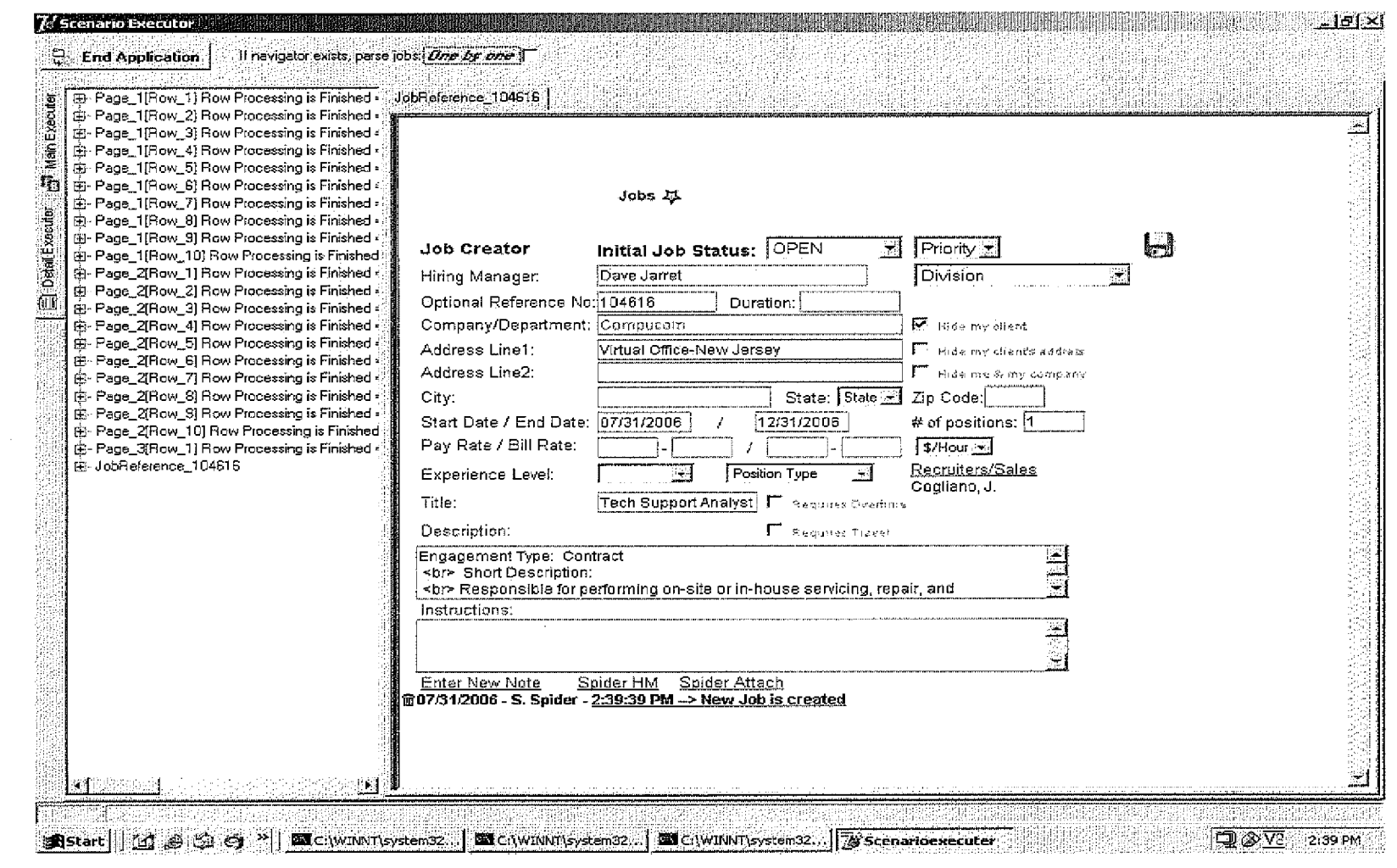

In some embodiments, the data transfer application can display a receiver web interface to which data is sent, as illustrated in FIG. 18. The data transfer application can populate the receiver interface with a sample set of the data retrieved from the sender web interface, thereby allowing the user to verify that the data is being properly sent to the receiver web interface. This functionality also allows a user with no programming background to verify that the scenario is operating properly. In the event that the sender or receiver web interfaces have been modified, the user can use the scenario designer application to quickly modify the scenario to operate in accordance with the web interface changes.

In some embodiments, the scenario designer application can compile executable software which can be run by server 120 or other such device. In some embodiments, the data transfer application needs to be installed on server 120 for the user created scenario to be executed. As described above, in some embodiments, the scenario designer application can output routines and macros, and such macros and routines can be executed by a data transfer application. Such routines and macros may be stored, for example, on server 120, receiver web interface 130 or database 140. Appendices A through F provide exemplary macros, or scenarios, that can be run by a data transfer application. Appendix A is an XML-based scenario generated by the user when performing the steps described above in conjunction with FIGS. 2-4. Appendix B is exemplary XML generated by the user when performing the steps described above in conjunction with FIGS. 5-8. Appendix C is exemplary XML generated by the user when performing the steps described above in conjunction with FIGS. 9-12. Appendix F is an exemplary, complete XML scenario generated as the user performs the steps described above in conjunction with FIGS. 2-12. Appendix D comprises an exemplary, XML-based scenario which is executed by the data transfer application illustrated in FIGS. 13-15. Appendix E comprises an exemplary, XML-based scenario which is executed by the data transfer application illustrated in FIGS. 16-18.

While detailed and specific embodiments of the system and method for automating the transmission of data from a web interface to another have been described herein, it will be apparent to those skilled in the art that various changes and modifications can be made therein without departing from the spirit and scope of the system and method for automating the transmission of data from a web interface to another. Thus, it is intended that the present disclosure cover these modifications and variations provided they come within the scope of any appended claims and/or their equivalents.

What is claimed is:

1. Computer program process code, tangibly stored on at least one non-transitory computer readable medium, the computer program process code comprising instructions implementing a scenario designer, comprising instructions for:
    causing the scenario designer to enter an initialization mode, the initialization mode comprising:
    i) receiving from a user a sender web interface from which information is to be obtained;
    ii) displaying to the user the sender web interface within a web interface display area;
    and,
    causing the scenario designer to enter run mode, the run mode comprising:
    i) monitoring user interaction with the sender web interface to determine navigation steps;

ii) displaying a sender web interface to the user for each navigation step, and allowing the user to map data fields from the sender web interface to corresponding fields within a database or a recipient interface by selecting data fields on the sender web interface;
iii) storing data field mappings; and
iv) storing the navigation steps; and,
generating a scenario from the stored data field mappings and the navigation steps;
wherein any necessary credentials are obtained and stored in the scenario, and wherein the method further comprises the steps of:
connecting to the sender web interface over a first communication network;
retrieving a data field from the sender web interface, according to the scenario;
formatting the data field, according to the scenario, to create a formatted data field; and,
transmitting the formatted data field, from a server, to the user database or recipient interface over a second communication network, according to the scenario.

2. The computer program according to claim 1, further comprising instructions for periodically causing a server to execute the scenario.

3. The computer program according to claim 1, wherein a plurality of sender web interfaces are received from the user as part of the initialization mode, and wherein the run mode is entered for each of the plurality of sender web interfaces.

4. The computer program according to claim 1, wherein the scenario comprises a series of instructions, interpretable by a server, for automating the retrieval of data.

5. The computer program according to claim 1, further comprising causing the scenario designer to load a scenario and allowing the user to edit the stored data field mappings.

6. The computer program according to claim 1, wherein the run mode further comprises receiving a user formatting selection from the user via the scenario designer application, the user formatting selection comprising at least one function to be applied to a mapped sender web interface data field.

7. The computer program according to claim 6, wherein the user formatting selection is stored as part of the scenario.

8. The computer program according to claim 1, wherein the first and second communications networks comprise the same communication network.

9. A data transfer method, comprising:
displaying a scenario designer application to a user;
receiving a sender web interface address from the user via the scenario designer application;
displaying, based on the received sender web interface address, a sender web interface to the user via the scenario designer application;
determining navigation steps by monitoring user interaction with the sender web interface;
receiving a sender web interface data field mapping from the user via the scenario designer application, the sender web interface data field mapping comprising a mapping of at least one sender web interface data field to at least one data field in a user database or a recipient web interface;
defining and storing a scenario, the scenario comprising the navigation steps and the sender web interface data field mapping;
wherein any necessary credentials are obtained and stored in the scenario, and wherein the method further comprises the steps of:
connecting to the sender web interface over a first communication network;
retrieving a data field from the sender web interface, according to the scenario;
formatting the data field, according to the scenario, to create a formatted data field; and
transmitting the formatted data field, from a server, to the user database or recipient interface over a second communication network, according to the scenario.

10. The method of claim 9, further comprising receiving a user formatting selection from the user via the scenario designer application, the user formatting selection comprising at least one function to be applied to a mapped sender web interface data field.

11. The method of claim 10, wherein the user formatting selection is stored as part of the scenario.

12. The method of claim 9, wherein the scenario is stored on a server.

13. The method of claim 9, wherein the first and second communications networks comprise the same communication network.

14. The method of claim 13, wherein the communication network is an Internet.

15. The method of claim 9, wherein the data field is retrieved from the sender web interface via a server.

16. The method of claim 9, wherein the sender web interface data field mapping further comprises a mapping between a sender web interface data field and at least one local data field.

17. The method of claim 16, wherein the sender web interface data field mapping further comprises a mapping between the at least one local data field and at least one data field in the recipient web interface.

* * * * *